United States Patent [19]

Almblad

[11] E Patent Number: Re. 32,914

[45] Reissued Date of Patent: May 2, 1989

[54] KEY AND RETAINER CARD COMBINATION

[75] Inventor: Donald F. Almblad, Scottsdale, Ariz.

[73] Assignee: Creditcard Keys Company, Ariz.

[21] Appl. No.: 154,354

[22] Filed: Feb. 10, 1988

Related U.S. Patent Documents

Reissue of:

[64] Patent No.: 4,637,236
Issued: Jan. 20, 1987
Appl. No.: 619,936
Filed: Jun. 12, 1984

[51] Int. Cl.[4] ..... A45C 11/32; A47G 29/10; A44B 15/00

[52] U.S. Cl. ..... 70/458

[58] Field of Search ..... 70/456–459; 40/2 A, 330; D3/61, 62; 206/37–37.8, 39

[56] References Cited

U.S. PATENT DOCUMENTS

| | | |
|---|---|---|
| D. 174,543 | 4/1955 | Goessling . |
| D. 245,371 | 8/1977 | Mowry . |
| D. 259,073 | 5/1981 | Holmes . |
| D. 270,046 | 8/1983 | Burkheimer . |
| D. 278,574 | 4/1985 | Kilpatrick . |
| 878,739 | 2/1908 | Newman . |
| 1,766,599 | 6/1930 | Cahill . |
| 2,105,304 | 1/1938 | Wagner . |
| 2,201,127 | 5/1940 | Schechter . |
| 2,322,920 | 11/1939 | Campbell . |
| 2,349,745 | 5/1944 | Morris . |
| 2,488,240 | 11/1949 | Ramsey . |
| 2,625,190 | 1/1953 | Dimond . |
| 2,633,012 | 3/1953 | Johnstone . |
| 2,672,747 | 3/1954 | Craig . |
| 2,694,244 | 11/1954 | Nolan . |
| 2,714,304 | 8/1955 | Dedda . |
| 2,734,624 | 2/1956 | Kernicki . |
| 2,859,789 | 11/1958 | Buckett . |
| 2,932,963 | 4/1960 | Walker . |
| 3,101,762 | 8/1963 | Bermingham . |
| 3,212,546 | 10/1965 | Lind . |
| 3,313,135 | 4/1967 | Reisner . |
| 3,318,354 | 8/1965 | Borisof . |
| 3,481,168 | 12/1969 | Unter . |
| 3,541,818 | 11/1970 | Dana . |
| 3,583,317 | 6/1971 | Gibson . |
| 3,606,777 | 9/1971 | Watson . |
| 3,933,017 | 1/1976 | Shee . |
| 4,037,716 | 7/1977 | Marks . |
| 4,125,920 | 11/1978 | Grimes . |
| 4,286,641 | 9/1981 | Watson . |
| 4,422,315 | 12/1983 | Klose . |
| 4,454,737 | 6/1984 | Toyoda . |

FOREIGN PATENT DOCUMENTS

| | | |
|---|---|---|
| 3242766 | 5/1984 | Fed. Rep. of Germany . |
| 58-111084 | 7/1983 | Japan . |
| 58-134982 | 9/1983 | Japan . |
| 845526 | 8/1960 | United Kingdom . |
| 934838 | 8/1963 | United Kingdom . |

*Primary Examiner*—Robert L. Wolfe

[57] ABSTRACT

A key and card combination is provided wherein a convenient size key carrying card has at least one recess, or a pair of recesses for a set of keys, a key in each recess, and structure separably retaining the key in its recess. The keys may be hingedly attached to the card and adapted to be swung into and out of the plane of the card. Alternatively, each key may be retained in the card by breakaway means. Further alternatively, each key may be received endwise in a socket recess extending inwardly in an edge of the card, and with tongue and groove and detent structure retaining the key separably in its socket.

48 Claims, 2 Drawing Sheets

KEY AND RETAINER CARD COMBINATION

Matter enclosed in heavy brackets [ ] appears in the original patent but forms no part of this reissue specification; matter printed in italics indicates the additions made by reissue.

The present invention relates to keys, especially of the tumbler lock operating type and key holders or retainers, and is more particularly concerned with a novel key and retainer card combination.

Automobile keys, house keys, and the like, which are virtually universally adapted for operating tumbler locks, are generally supplied loosely or in envelopes, key rings or key holders of various types. This is true for original issue keys, duplicate key sets and replacement keys.

Carrying of emergency duplicate keys generally presents a problem. Loose keys are extremely inconvenient to carry or store for emergency use, and this is particularly true of automobile keys. One expedient for making duplicate automobile keys available has been by placing them in a magnetic container which can be held magnetically to an accessible ferrous part of an automobile. The magnetic containers, however, are liable to be dislodged or lost. Carrying loose duplicate keys in a wallet, purse or garment pocket has obvious limitations and is generally inconvenient.

An important object of the present invention is to provide new and improved means for handling keys conveniently and in a manner readily adapted for wallet, purse and pocket storage, and especially suitable for carrying of emergency duplicate keys.

Pursuant to the present invention, there is provided a new and improved key and card combination, comprising a key carrying card, at least one key recess in the card, a key in the recess, and means separably retaining the key in the recess.

Other objects, features and advantages of the present invention will be readily apparent from the following description of preferred embodiments thereof, taken in conjunction with the accompanying drawings, although variations and modifications may be effected without departing from the spirt and scope of the novel concepts of the disclosure, and in which.

Figure 1:
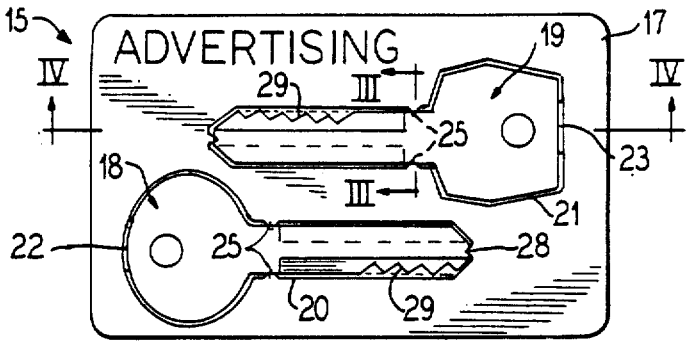
FIG. 1 is a plan view of a key and card combination embodying the present invention.

In one preferred form of the present invention, a key and retainer card combination 15 comprises a convenient, preferably generally wallet (e.g. credit card) size card 17 carrying at least one, and as shown a pair of car (automobile) keys 18 and 19. For example, the key 18 may be a car door and trunk lock key, and the key 19 an ignition key.

Figure 3:
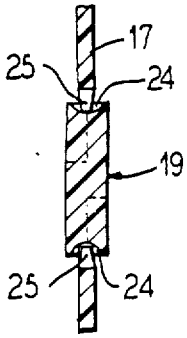
FIG. 3 is an enlarged fragmentary sectional detail view taken substantially along the line III—III in FIG. 1.
Figure 4:
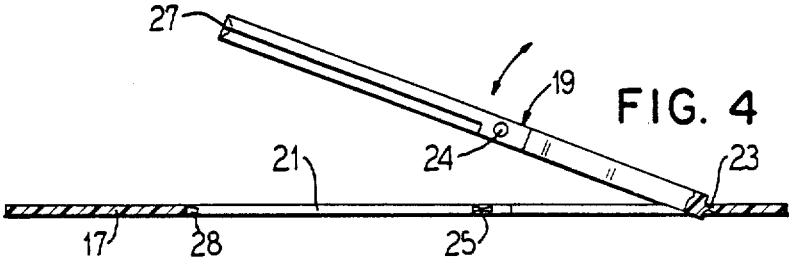
FIG. 4 is an enlarged longitudinal sectional detail view taken substantially along the line IV—IV in FIG. 1, but showing the key in a raised position.
Figure 5:
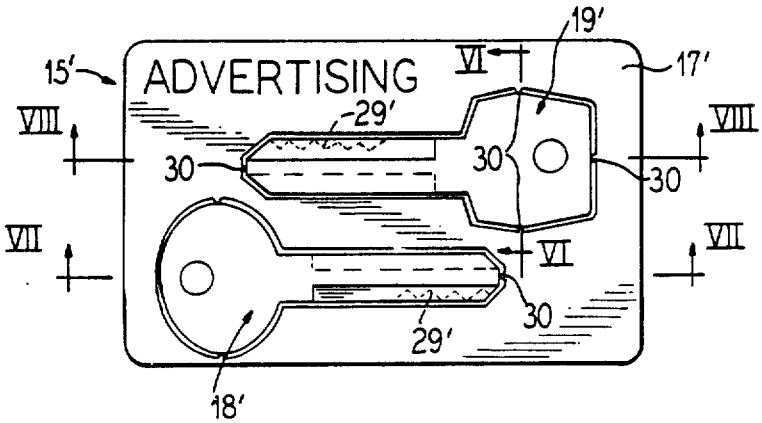
FIG. 5 is a plan view of a modification.
Figure 6:
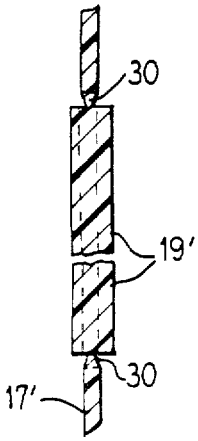
FIG. 6 is an enlarged fragmentary sectional detail view taken substantially along the line VI—VI in FIG. 5.
Figure 7:
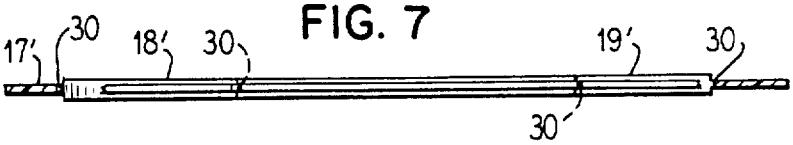
FIG. 7 is an enlarged longitudinal sectional elevational view taken substantially along the line VII—VII in FIG. 5.
Figure 8:
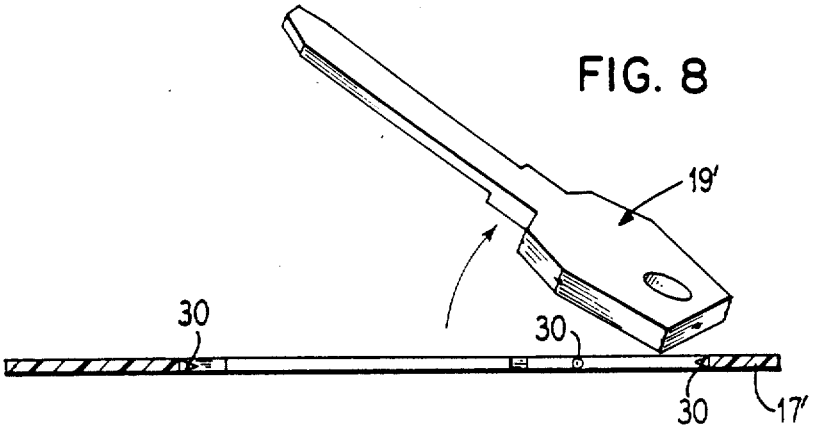
FIG. 8 is an enlarged sectional elevational detail view taken substantially along the line VIII—VIII in FIG. 5 and showing the key separated from the card.
Figure 9:
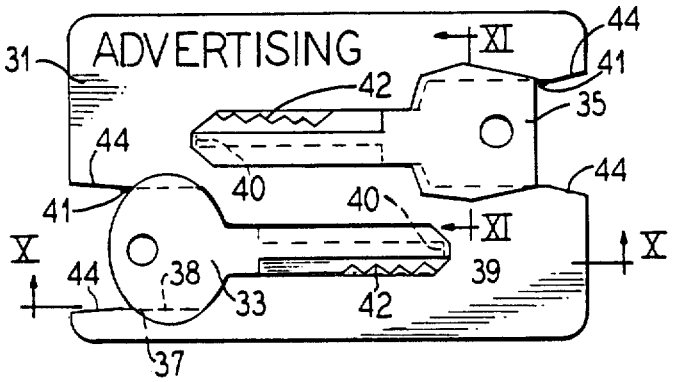
FIG. 9 is a plan view of another modification.
Figure 11:
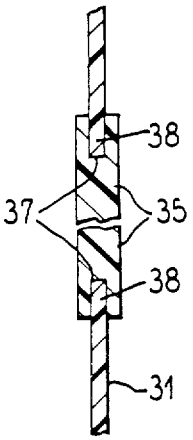
FIG. 11 is an enlarged fragmentary sectional detail view taken substantially along the line XI—XI in FIG. 9.
Figure 10:
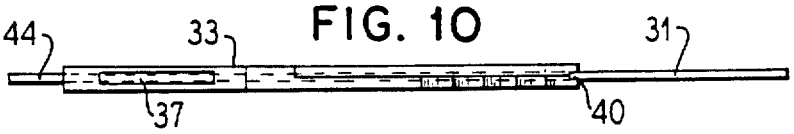
FIG. 10 is an enlarged sectional elevational view taken substantially along the line X—X in FIG. 9.
Figure 12:
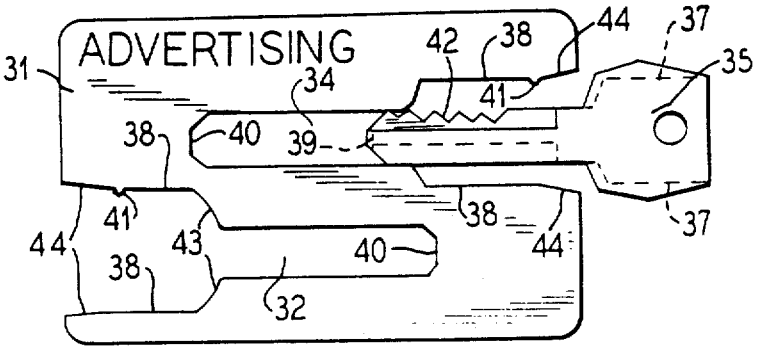
FIG. 12 is a view similar to FIG. 9 but showing how the keys are removable and replaceable in the socket recesses in the card.

The card 17 and the keys 18 and 19 may be made from the same material, such as a glass filled polycarbonate synthetic resin (plastic material) which may be injection molded and affords adequate stiffness without brittleness in both the card 17 and the keys 18 and 19. As depicted in FIGS. 3–4, the card 17 may be of a relatively thin section such as that commonly present in plastic credit cards. On the other hand, the keys 18 and 19 may be of a thicker section, such as about twice the card thickness, to withstand twisting stresses in use.

In a desirable arrangement, the keys 18 and 19 are located in the plane of the card 17, in respective key recesses or sockets there being a socket 20 for the key 18 and a socket 21 for the key 19. Each of the sockets is preferably of a size complementary to its key including the head of the key and the key shank, and with a sufficient clearance or tolerance relative to the edges of the keys to permit the keys to be readily received in the sockets and easily displaced from the sockets as desired.

Figure 2:
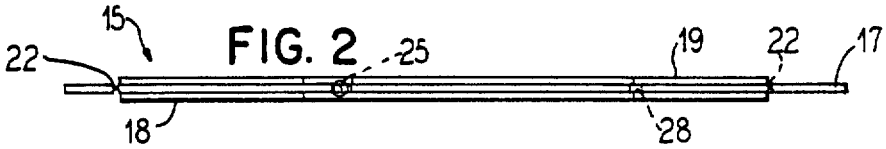
FIG. 2 is an enlarged side elevational view of the article of FIG. 1.

Each of the keys 18 and 19 may be permanently attached to the card 17 in a manner permitting the key to be swingably displaced from the plane of the card when desired. For this purpose, the key 18 has an integral hinge connection 22 attaching its head end to the card 17. Similarly, the key 19 is connected to the card 17 by means of an integral hinge 23. This permits the card-/key combination to be conveniently injection molded, wherein the sockets 20 and 21 are formed in the card 17, and the key 18 and 19 are adapted to be molded in generally displaced relation to the card but connected thereto by the integral respective hinges 22 and 23. Then the keys are adapted to be swung into their respective sockets in the card 17 and into the plane of the card as seen in FIG. 2, and from which the keys are adapted to be swung out at an angle to the card and swung back as desired, as indicated by directional arrow in FIG. 4.

For retaining the keys 18 and 19 in their respective recesses until it is desired to displace the keys for use, separable detent means may be provided comprising, for example, respective detent keeper recesses 24 at each side of the neck of each of the keys receptive of complementary detents 25 formed on the confronting edges of the card defining the recesses 20 and 21. In addition, or alternatively, each of the keys may have a detent keeper recess 27 in the tip of its shank receptive of a complementary detent projection 28 on the confronting edge of the card defining the associated key socket. Through this arrangement, when the keys are not in use for operating a tumbler lock, they may be snapped into their respective sockets substantially within the plane of the card 17 and wherein the separable detents will retain the keys against unintended displacement. When it is desired to use a key, it is easily pushed out of its socket by applying pressure against a face of the key to snap it out of engagement with its detent retaining means.

The keys 18 and 19 may be formed with usual longitudinal ribs and grooves in their shanks complementary to the key slots in the locks for which the keys are intended. As fabricated, the keys 18 and 19 may be simply blanks, each intended for a certain type of lock, for example for the lock of a particular make or model of automobile, or of whatever other type of lock for which intended. Since each lock has a particular tumbler code, each key must have its shank provided with notches 29 for the particular tumbler code for which intended. The notches are adapted to be cut in the shank edge by chipping or clipping out by means of a tool or a machine intended for that purpose. For example car dealers may have a key cutting machine which operates in accordance with a numerical code for cutting the desired ignition keys and the desired door and trunk keys. On the other hand, if the keys are intended to serve as emergency duplicates, the original keys may be used as templets in a machine that cuts duplicate keys from templets. While the keys 18 and 19 as shown in FIG. 1 have the tumbler notches indicated in full outline, it will be appreciated that as fabricated, the keys will have straight edges as indicated in dash outline.

In the modification of FIGS. 5–8, the key and card combination 15' has, similarly as the combination 15 in FIG. 1 a card 17' and keys 18' and 19'. The keys 18' and 19' start out as merely key blanks which are, as fabricated integrally attached to the card 17' within complimentary recesses by means of breakaway tabs 30 which integrally connect the key blanks to the card. There may be at least one of the breakaway tabs 30 connecting the tip of each key shank to the card, and a plurality of the tabs connecting the head of each of the key blanks, to maintain the blanks in a stable relation in the card until it is desired to remove one of the key blanks for processing the tumbler notches 29' in the edges of the key blank. The manner in which the key blanks are detached from the card 17' is demonstrated in FIG. 8 wherein separation of the key blank 19' is shown and it will be appreciated that removal of the key blank 18' may be effected in the same manner.

In another arrangement as shown in FIGS. 9–12, the card and keys of the combination are adapted to be fabricated separately and then assembled. To this end, a card 31 is provided with a recess socket 32 opening inwardly from one end to receive and substantially surround a key 33, and a recess socket 34 opening in from the other end to receive and substantially surround a key 35. Each of the sockets 32 and 34 is shaped to receive the shank of its key and the head of its key fully within the plane of the card and inset relative to the respective ends of the card. By having the keys on the order of twice the thickness of the card, the keys can be conveniently retained in their recesses in the card by means of a tongue and groove arrangement including, for example, longitudinally extending grooves 37 in the sides of the heads of the keys 33 and 35, and receptive of tongue-like flange edges 38 defining the enlarged portions of the sockets in the card 31 within which the keys are received for card-storage purposes. For stability the tip terminals of the shanks of the keys 33 and 35 may be provided with respective transverse grooves 39 receptive of complementary tongue flanges 40 at the inner ends of the slot-like sockets within which the keys are received in the card 31.

For retaining the keys 33 and 35 replaceable in the recesses 32 and 34, respectively, pressure releasable detent means may be provided, comprising in a simple structure detent nibs 41, desirably one for each of the keys, and located on one edge defining the key-head-receiving recess or slot enlargement and adapted to engage the key head adjacent to the other end of one of the grooves 37 in the head, i.e., at the crown of the key head. As a result, the detents 41 will, by reason of the resilience of the material of the card 31 snap into retaining engagement behind the associated key head when the key is fully inserted within its recess slot or socket in the card, and for removal of the key the head is adapted to be snapped out of its socket in the card past the retainer detents 41.

It will be appreciated that the keys 33 and 35 may be supplied originally as key blanks. The user may then have the key blanks processed by means of a templet or a numerical code to provide the key shanks with appropriate tumbler operating notched edges 42. The keys 33 and 35 may be molded plastic, e.g. glass filled polycarbonate, or conventional aluminum or other metal keys.

Matching a set of keys 33 and 35 with their appropriate key recess sockets in the card 31 is facilitated by formation of the head-receiving enlarged portion of each key socket appropriate to the respective key to be received in that socket. For example, it will be noted that the key 33 has a wider head than the key 35, and the sockets 32 and 34 are appropriately of complementary dimension in the head receiving portions. Proper orientation of the keys 33 and 35 in the plane of the card 31 is assured by engagement of the tongue structures 38 in the corresponding grooves 37 in the key heads. After the key is fully received within its socket, the tongue structures 40 engaging within the grooves 39, together with the tongue and groove interengagement at the key heads, and the retention or interlocks by the detents 41 assures that the keys will be thoroughly retained within the plane of the card 31 against unintended displacement.

In order to facilitate reception of the generally tapered tips of the shanks of the keys 33 and 35 in the key shank receiving portions of the key sockets 32 and 34, the junctures of the head receiving portions of the sockets with the narrower key shank receiving portions of the sockets are desirably provided with inwardly tapering edges 43. To facilitate reception of the heads of the keys 33 and 34, the entrances into the enlarged key head receiving portions of the sockets 32 and 34 are desirably provided with tapered lead in cam surfaces 44. This facilitates manual insertion of the respective keys into their sockets.

By virtue of the greater thickness of the keys 33 and 35 relative to the card 31 alignment of the keys within the plane of the card when returning a key to its socket is facilitated for digital guidance by sense of touch as the key is grasped between the thumb and another finger of the manipulating hand.

From the foregoing, it will be apparent that the present invention provides a novel key and retainer card combination well adapted for spare key storage and use or original issue key storage and use. The combination facilitates handling and storage of the keys as for example for wallet, hand bag, purse or pocket storage and retrieval. The flat structural relationships of the combination assures maximum utilization of minimum storage space, especially for key sets. Since the keys are preferably of a greater thickness than the storage card and with face areas of the keys elevated from the planes of the adjacent faces of the card, use of the present device in the dark or by sightless persons is facilitated by ability to differentiate key from card by sense of touch. Any of the key and retainer card combinations described, or modifications thereof are adapted to be produced economically and supplied at low cost.

Although car keys have been indicated in the illustrated forms of the invention, it will be appreciated that other types of tumbler lock keys may be similarly handled, such as house keys, office keys, mailbox keys, luggage keys, or any other keys adapted to operate tumbler locks.

It will be understood that variations and modifications may be effected without departing from the spirit and scope of the novel concepts of this invention.

I claim as my invention:

1. A key and card combination, comprising:
a key carrying generally rectangular wallet size plastic card of credit card-type thickness and dimensions and having opposite faces;
at least one key recess in said card extending entirely through the thickness of the card;
a key of greater thickness than the card in said recess consisting of the same plastic material as said card, said key having a thickness for substantially resisting twisting when used in a lock;
said key having an edge thereabout, and said recess being defined by an edge substantially surrounding said key edge;
and means on an area of said key edge and on a corresponding area of said recess edge for separably retaining the key in said recess and with the key having a face portion which is elevated from the plane of the adjacent card face.

2. A combination according to claim 1, wherein said recess comprises a key socket within the plane of said card, and said separably retaining means comprising a hinge formed from the same material as the card and the key and integrally connecting a key head crown end of the key to said corresponding area of said recess edge of the card and adapting the key to be swung into and out of the plane of the card.

3. A combination according to claim 1, wherein said means separably retaining the key comprises breakaway structure.

4. A combination according to claim 1, wherein said means separably retaining the key comprises yieldable detent structure.

5. A combination according to claim 4, wherein said means separably retaining the key further includes a hinge connecting a head end of the key to the card so that the key can be swung into and out of said recess while remaining attached to the card.

6. A combination according to claim 1, wherein said card and said key are fabricated in one piece from a plastic material.

[7. A combination according to claim 1, wherein said card is fabricated from a plastic material, and said key is fabricated from metal.]

8. A combination according to claim 1, wherein said recess comprises a socket extending inwardly in the card from one edge of the card, said key being receptive in the socket by an endwise shank-first maneuver into the socket, and said means separably retaining the key comprises tongue and groove structure in and along said edges of the key and along edges defining the socket in the card.

9. A combination according to claim 8, wherein said socket is longer than the length of the key including the key shank and the key head, so that when the key is fully received in the socket said head is located within the socket and has its crown end spaced inwardly from said one end of the card, and said separably retaining means comprising a yieldably detent retainingly engagable with a shoulder at said key head crown end.

10. A combination according to claim 8, wherein said recess has tapered lead in surfaces for facilitating reception of the key in the recess socket.

11. A combination according to claim 1, wherein the card includes a second key recess, and a second key, and means for separably retaining the second key in the second recess, so that the card is adapted for carrying a set of keys.

12. A combination according to claim 1, wherein said key has a further face portion opposite to said elevated face portion which is also elevated from the card face which is adjacent to said further face portion.

13. A key card combination, comprising:
a key-shaped recess socket in the plane of the card;
a key in the recess socket consisting of the same material as said card so that said key and card can be simultaneously formed;
integral hinge means consisting of the same material as said key and said card connecting an edge of a head end of the key to an edge of the card in said socket for permitting the key to be swung out from and swung back into the plane of the card without severing said hinge means; and
means formed of the same material as said key, said card and said hinge means for at least initially retaining the key separably in said recess socket against being swung out of said recess.

14. A combination according to claim 13, wherein said key is thicker than said card and said retaining means comprising detent nib and keeper recess structure wherein the nib is on the card and the key has a keeper recess receptive of the detent nib.

15. A combination according to claim 14, wherein said detent nib and keeper recess are located at the tip end of a shank of the key.

16. A combination according to claim 14, wherein said structure is located on a key neck at juncture of a head and shank of the key.

17. A key and card combination, comprising:
a key carrying generally rectangular wallet size card of relatively thin section such as that commonly present in plastic credit cards and having opposite faces;
a recessed socket extending inwardly from an edge of the card, and complementary to a key to be received in the card;
a key thicker than said card and separably receptive by longitudinal maneuver of its shank and head into said socket; and
groove means in side edges of the key and complementary tongue means along sides of the recess slidably received in said groove means for separably retaining the key in the socket with a face area of the key being elevated from the plane of the adjacent card face.

18. A combination according to claim 17, wherein said tongue and groove means are located along opposite sides of the key head and the key head receiving portion of the socket.

19. A combination according to claim 18, wherein said tongue and groove means further includes a tongue and groove structure at the tip end of the key and the key tip receiving portion of the socket.

20. A combination according to claim 17, wherein the key has in the tip end of its shank a groove, and the card has a complementary tongue structure receptive in said groove.

*21. A key device comprising:*

*card means, said card means including recess means therein;*

*key means;*

*connecting means connecting said key means and said card means, said connecting means being adapted to permit said key means to be swung out of and back into, said recess means; and*

*said card means, said key means and said connecting means being integrally formed of plastic.*

*22. A key device as defined in claim 21 wherein said key means includes a key head and a key shank, said card means including an edge defining said recess; said connecting means connecting said key head and said card edge.*

*23. A key device as defined in claim 22 wherein said connecting means is adapted to be flexed to enable said key member to be swung out of and back into, said recess means.*

*24. A key device as defined in claim 23 including a break-away tab integrally connecting said key shank and said card means.*

*25. A key device as defined in claim 21 wherein said key means comprises a key blank situated in said recess means; said key blank, said connecting means and said card comprising a moulded plastic single-piece structure formed as a unit.*

*26. A key device as defined in claim 21 wherein said key means comprises a plastic key which has been cut from a plastic key blank; said plastic key blank, having been integrally moulded with said card and said connecting means as a single piece structure.*

*27. A key device as defined in claim 21 wherein said key means comprises two key blanks; each of said key blanks including a key head; said connecting means connecting each of said key heads to said card means and adapted to permit each of said key blanks to be individually swung out of and back into, said recess means.*

*28. A key device as defined in claim 21 wherein said recess means comprises an opening in said card means, said key means comprises a key blank having a key head and a key shank, said card means including an edge defining said opening, said connecting means connecting said key head to said edge, said connecting means being sufficiently flexible to permit said key blank to be swung out of and back into, said opening.*

*29. A key device as defined in claim 21 wherein said connecting means comprises a hinge comprising a flexible member connecting said key means and said card means and integrally formed therewith.*

*30. A plastics material card and key combination comprising:*

*a generally credit card-shaped plastics material member having a top surface and at least one generally key-shaped recess formed therein open to the top surface;*

*a plastics material key blank, having a shank portion having one edge adapted to be processed to provide the key shank with appropriate tumbler operating notched edges, in said recess;*

*means for retaining said key in said key-shaped recess; and*

*said key, said means, and said card being molded in situ.*

*31. The plastics material card and key of claim 30 wherein said means for retaining is flexible whereby said key can be biased out of the plane of the card without fracturing said means.*

*32. The plastics material card and key of claim 30 wherein said means for retaining is flexible whereby said key can be biased out of the plane of the card and back into the plane of the card without fracturing said means.*

*33. The plastics material card and key of claim 30 wherein the means for retaining includes a frangible connector.*

*34. The plastics material card and key of claim 30 wherein the key has a greater thickness than the card.*

*35. The plastics material card and key of claim 30 wherein the key-shaped recess extends, at least in part, through a thickness of the card.*

*36. The plastics material card and key of claim 30 including two plastics material key blanks.*

*37. A key and card combination comprising:*

*(a) a molded plastics material thin card having top and bottom surfaces, and a surrounding thin edge surface;*

*(b) a recess in said card, shaped to receive a key blank of generally standard key blank size, the recess defined at least in part by a recess edge surface;*

*(c) a molded plastics material key blank of generally standard key blank size dimensioned to be received in the recess having an enlarged head end with a projecting shank, the head end defined by top, bottom and edge surfaces;*

*(d) a first molded surface configuration formed on a first surface of the card;*

*(e) a second molded surface configuration formed on a second surface of the key blank at the head end of the key blank;*

*(f) one of said first and second configurations being a female configuration projecting into its associate surface;*

*(g) another of said first and second configurations being a male configuration projecting from its associated surface;*

*(h) said first and second configurations adapted to releasably mate together having overlapping surfaces preventing removal of the key blank from the card to secure said key blank to said card against removal movement in at least one axis direction with said key blank in said recess with said first and second surfaces in opposition to one another; and*

*(i) and said key being repeatedly entirely removable from said card by releasing the mating of said configurations and secured to said card by mating said configurations together.*

*38. The key and card combination of claim 37 wherein the recess extends at least in part entirely through the card from the top surface to the bottom surface.*

*39. The key and card combination of claim 37 wherein the first configuration is formed on the edge surface of the recess.*

*40. The key and card combination of claim 37 wherein the second configuration is formed on the edge surface of the key blank head end.*

*41. The key and card combination of claim 37 wherein the mating configurations secure the key blank against movement relative to the card in two axis normal to one*

*another and a detent is provided securing the key blanks in a third normal axis.*

*42. The key and card combination of claim 37 wherein the female configuration is formed on the key blank and the male configuration is formed on the card.*

*43. The key and card combination of claim 37 including two key blanks.*

*44. The key and card combination of claim 37 wherein the key blank has a greater thickness than the card.*

*45. A key and card combination comprising:*

*(a) a thin molded plastics material card carrier having top and bottom surfaces with a recess molded in said card from said top surface, said recess being sized to receive a standard sized key blank therein and being defined by an edge surface;*

*(b) a molded plastics material key having an enlarged head end and a projecting shank, said head end having top, bottom and edge faces;*

*(c) said key dimensioned to be received in said recess with at least one face opposed to at least one surface;*

*(d) molded resilient snap securing means molded into one of said opposed surfaces and said opposed faces effective to interact with a portion of the opposed one of said faces and surfaces when said key is fully seated in said recess;*

*(e) said snap means effective to releasably retain said key in said recess;*

*(f) said portion positioned and configured with respect to remaining portions of its one of said faces and surfaces to cause at least parts of said securing means to resiliently move during insertion or removal of said key from said recess.*

*46. The combination of claim 45 wherein the recess has a head end configured to closely mate with the key head end.*

*47. The combination of claim 45 wherein the securing means is a projecting detent on the edge surface of the head end of the recess and the position is part of the edge face of the key head end.*

*48. The combination of claim 45 wherein the recess extends entirely through the carrier.*

*49. A key and key carrier combination comprising: a plastics material key carrier of generally rectangular wallet size and of relatively thin section such as that commonly present in plastic credit cards, and having opposite end edges, first and second key receiving recesses in said carrier extending into said carrier from opposite edges of said carrier longitudinally of said carrier, first and second molded plastics material keys having a thickness greater than the material thickness of said carrier, said keys longitudinally slidably received in said recesses and slidable with respect to said recesses into and out of said opposite edges, and complementary tongue and groove means formed on a head end of said keys and by wall means of said recesses said complementary tongue and groove means allowing said keys to slide with respect to said recesses in a direction longitudinal of said keys but restraining said keys against movement normal to said longitudinal movement and restraining means associated with said recess and with said head end of said keys for retaining said keys in said recess.*

* * * * *